United States Patent

Halden et al.

Patent Number: 5,158,794
Date of Patent: Oct. 27, 1992

[54] MARINATING OR PICKLING OF MEAT

[75] Inventors: Jonas P. Halden; Carl-Henrik Mathiesen, both of Helsingborg, Sweden; Michael S. Proctor, Louth, England

[73] Assignee: Nestec S.A., Vevey, Switzerland

[21] Appl. No.: 625,778

[22] Filed: Dec. 7, 1990

Related U.S. Application Data

[63] Continuation of Ser. No. 387,790, Aug. 1, 1989, abandoned.

[30] Foreign Application Priority Data

Aug. 11, 1988 [EP] European Pat. Off. ........ 88113048.8

[51] Int. Cl.⁵ ............................................. A23D 1/31
[52] U.S. Cl. .................................... 426/281; 426/641; 426/643

[58] Field of Search ............... 426/281, 641, 652, 643, 426/644

[56] References Cited

U.S. PATENT DOCUMENTS

| | | | |
|---|---|---|---|
| 3,506,455 | 4/1970 | Savage et al. | 426/641 X |
| 3,537,864 | 11/1970 | Magiera | 426/641 |
| 3,770,463 | 11/1973 | McSweeney et al. | 426/641 X |
| 4,071,635 | 1/1978 | Lindl et al. | 426/652 X |
| 4,746,522 | 5/1988 | Wofford et al. | 426/281 X |
| 4,780,327 | 10/1988 | Carimi et al. | 426/641 X |

*Primary Examiner*—Arthur L. Corbin
*Attorney, Agent, or Firm*—Vogt & O'Donnell

[57] ABSTRACT

Meat is marinated or pickled in a marinating or pickling medium which contains a heat stable starch in an amount of from 0.1% to 5.0% by weight based upon the weight of the meat.

16 Claims, No Drawings

MARINATING OR PICKLING OF MEAT

CROSS REFERENCE TO RELATED APPLICATION

This is a file wrapper continuing application of application Ser. No. 07/387,790, filed Aug. 1, 1989, now abandoned.

BACKGROUND OF THE INVENTION

The present invention relates to a process for marinating or pickling a meat product.

During the processing of meat products, juices tend to be lost and this reduces the final yield. Meat products are often marinated or pickled before cooking in order to preserve or tenderise them, or to enhance their flavour. However, standard marination procedures have little or no effect on the final yield.

SUMMARY OF THE INVENTION

We have now found, surprisingly, that by adding a heat-stable starch to the marination or pickling medium the loss of juices is significantly less and the yields are correspondingly increased. In addition, the presence of such starches may, in many instances, shorten the cooking times and also modify or tenderise the texture of the meat products.

Accordingly the present invention provides a process for marinating or pickling a meat product which comprises treating the meat product with a marinating or pickling medium characterized in that the marination or pickling medium contains from 0.1% to 5.0% by weight of a heat stable starch based on the weight of the meat product.

The meat product may be, for example, beef, pork, tongue, lamb, veal, game or poultry such as chicken, turkey and duck or fish. The size of the meat product may vary from diced pieces, slices, individual cuts, up to whole sides of whole carcasses including poultry carcasses. Examples of suitable meat products are plank steak, beef chuck, beef shoulder, chicken breast and chicken leg. With regard to fish, the process of this invention is parti-cularly suitable for non-oily fish especially white fish of sea-caught species or fresh water types which have a tendency to become dry and fibrous and develop off-flavours when thermally processed or subsequently on storage.

DETAILED DESCRIPTION OF THE INVENTION

In the present invention, the composition of the marinating or pickling medium and the duration of the treatment may vary according to the meat product but it usually contains, in addition to the starch, the standard ingredients. For instance, a marinating medium may contain standard ingredients such as oil, flavours, sugar, salt, seasonings, acidic agents such as vinegar, lemon juice, or wine. The amount of salt present in the marinating medium may provide from 0.5 to 3%, preferably from 0.75 to 2% and especially from 1 to 1.5% by weight based on the weight of the meat. Soy sauce or a similar product may be present both as a seasoning and as an acidifying agent. The marina-ting medium is generally acid and the pH is usually from 2 to 7, preferably from 3 to 6 and especially from 4 to 5. A pickling medium is more usually neutral.

The amount of the marinating or pickling medium for non-fish products may be, for instance, from 5 to 40%, more usually from 10 to 35% and preferably from 15 to 30% by weight based on the weight of meat. For fish, the amount of marinating or pickling medium may be from 2 to 30% and preferably from 5 to 15% by weight based on the weight of raw fish.

Conveniently the meat product is treated by contacting it with the marinating or pickling medium by overnight maturation, vacuum tumbling or injection followed by tumbling in the marination medium for a period of time to allow penetra-tion of starch into the meat which may vary from a few minutes, e.g., 2 to 20 minutes, more usually from 3 to 15 minutes, to a few days. The marinating or pickling treatment is preferably carried out at a low temperature such as a refrigeration temperature, e.g., from about 3° to 8° C. Conveniently the meat is tempered to a temperature from $-3°$ C. to $+3°$ C., preferably from $-2°$ C. to $+2°$ C. before the treatment. Smaller pieces of meat may conveniently be treated by tumbling whereas larger pieces of meat are advantageously injected followed by tumbling.

The heat stable starch may be a modified starch, e.g., a starch. The cross-linking may be achieved for instance by forming a diester with phosphoric acid ($POCl_3$ is the most common reagent) or by forming an ether bond usually by reacting with epichlorhydrin.

The heat stable starch is preferably also freeze-thaw stable. Heat stable and freeze-thaw stable starches are readily available commercially and those skilled in the art will have no difficulty in ascertaining those which are suitable. They may be obtained from any conventional source, e.g., wheat, rice or maize.

The amount of starch present in the marinating or pickling medium is preferably from 0.25% to 2.5%, more preferably from 0.5% to 2.0% and especially from 0.75% to 1.5% by weight based on the weight of meat product.

Based on the weight of the marinating or pickling medium, the amount of starch is conveniently from 0.5% to 10%, preferably from 1 to 6% and especially from 2 to 4% by weight.

The process of the present invention is suitable for preparing pre-cooked chilled, deep frozen or thermally processed products.

After being marinated or pickled, the meat may be prebrowned and then cooked, for instance, by frying or oven heating or both. The frying may be carried out on a contact fryer at a temperature of, for example, 175° to 195° C. for a period of from 30 seconds to 5 minutes. The oven heating is usually carried out for a period of from 1 to 4 hours at a temperature from, for example, 60° C. to 100° C. By the process of the present invention the duration of oven heating can be substantially reduced when compared with conventional methods.

The meat may be packed either before or after cooking, or the meat may be packed in between the stages of a two-step cooking process. After cooking, the meat may be sterilized, pasteurized, chilled or deep-frozen.

The products obtained by the process of the present invention may be prepared for consumption by microwave reheating, such as for standard boil-in-bag products, or by oven reheating, such as for products packed in foils. The quality of the products is excellent with respect to texture, juiciness, flavour and appearance.

EXAMPLES

The following examples further illustrate the present invention. Parts and percentages are given by weight.

In the examples, two marinates A and B having a pH of 4.5 and 4.7 respectively were made containing the following ingredients:

|  | A | B |
| --- | --- | --- |
| Pure corn oil | 15.0 | 15.0 |
| Dextrose | 12.0 | 4.0 |
| Salt | 6.4 | 5.0 |
| Seasoning | 0.8 | 0.8 |
| Soy sauce, decolourised | 8.0 | 15.0 |
| COLFLO 67* | 2.0 | 4.0 |
| Water to | 100% | 100% |

*A heat stable/freeze thaw stable modified maize starch.

EXAMPLE 1

200 parts of chicken breast pieces tempered to +2° C. were marinated by vacuum tumbling with 40 parts of marinate A for 10 minutes −0.8 bar. after marination, the chicken breasts were fried in a square belt oven at 185° C. for 2 minutes. Little or no juice was lost during frying and the yield varied from 95-100%. The chicken breasts were then cooled, packed and deep frozen. After reheating for consumption, the final yield on the consumer's plate varied from 85-94% and the chicken breasts were very tender.

COMPARATIVE EXAMPLE A

A similar procedure to that described in Example 1 was followed except that the Colflo 67 was omitted from the marinate. The yield was only 85-90% after frying and the final yield on the consumer's plate was only 75-78%. In addition, the chicken breasts were not as tender as those of Example 1.

EXAMPLE 2

Shoulder fillet was trimmed of surface fat and tissue and cut into 25 mm slices. 400 parts of these, flank steak slices tempered to +1° C. were marinated by vacuum tumbling with 100 parts of marinate B for 10 minutes at −0.8 bar. After marination, the flank steak was fried in a square belt oven at 185° C. for 3 minutes. Little or no juice was lost during cooking and the yield varied from 95-100%. The flank steak pieces were then cooled, sliced to 4/5 mm, packed and deep frozen. After reheating for consumption, the final yield on the consumer's plate was 70% and the flank steak pieces were very tender.

COMPARATIVE EXAMPLE B

A similar procedure to that described in Example 2 was followed except that the Colflo 67 was omitted from the marinate. The yield was only 85-90% after cooking and the final yield on the consumer's plate was only 60%. In addition, the flank steaks were not as tender as those of Example 2.

EXAMPLE 3

400 parts of diced beef tempered to 0° C. were marinated by vacuum tumbling with 100 parts of marinate B for 10 minutes at −0.8 bar. After marinating, the diced beef was browned by frying for one minute at 185° C. in a square belt oven after which the yield was 80%. The diced beef was then cooked for 2 hours in a steam oven (half the normal time) at 90° C. in bouillon, drained, cooled, packed in sauce and deep frozen. After reheating for consumption, the final yield on the consumer's plate was 72% and the diced beef was very tender.

COMPARATIVE EXAMPLE C

A similar procedure to that described in Example 3 was followed except that the Colflo 67 was omitted from the marinate and the fried marinated diced beef was cooked for 4 hours (the normal length of time). The yield was only 72% after frying and the final yield on the consumer's plate was only 58%. In addition, the diced beef was not as tender as that of Example 3.

EXAMPLE 4

A similar procedure to that described in Example 3 except that after frying, the diced beef was packed in sauce and cooked in sauce for 2 hours at 90° C. before chill freezing. After reheating for consumption, the final yield on the consumer's plate was 72% and the diced beef was very tender.

EXAMPLE 5

400 parts of beef shoulder trimmed to joint size and tempered to +1° C. were injected by needles with 100 parts of marinate B and vacuum tumbled for 15 minutes at −0.8 bar. The beef was then packed in cook netting, heated for 3 hours at 90° C. and cooled. The yield was 70%. The beef was then sliced, packed in sauce, pasteurized and deep frozen. After reheating for consumption, the final yield on the consumer's plate was 69% and the sliced beef was very tender.

COMPARATIVE EXAMPLE D

A similar procedure to that described in Example 5 was followed except that Colflo 67 was omitted from the marinate and the sliced beef was heated for 11 hours at 90° C. after being marinated. After heating, the yield was only 66% and the final yield on the consumer's plate was only 61%. In addition, the sliced beef was not as tender as that of Example 4.

EXAMPLE 6

A similar procedure to that described in Example 5 was followed except that after packing in cook netting, the beef was oven cooked for 1.5 hours at 70° C., cooled, sliced, packed in sauce, cooked in a vacuum pouch for 1.5 hours at 90° C. and then deep frozen. After reheating for consumption, the final yield on the consumer's plate was 66% and the sliced beef was very tender.

COMPARATIVE EXAMPLE E

A similar procedure to that described in Example 1 was followed except that the Colflo 67 was replaced by a similar quantity of ordinary potato starch. The yield was 10% lower and the chicken breasts were significantly less tender than those of Example 1.

EXAMPLE 7

A marinate was made containing the following ingredients:

| Peanut oil | 50 parts |
| --- | --- |
| Salt | 10 parts |
| Seasoning | 1 part |
| Lemon juice | 1 part |
| Colflo 67 | 10 parts |
| Water | 20 parts |

4 plaice fillets, each weighing 200 parts, were marinated by adding 20 parts by weight of the above marinate and allowed to stand for 8 hours at +2° C. After marination, the plaice fillets were cooked without colour to set the protein/starch present in the fish. Sauce was then added and the 4 products were then treated separately in the following ways:

(a) pasteurized for chilled product sale
(b) not pasteurized for fresh short shelf life sale
(c) thermally processed to give a long shelf life
(d) fully sterilized After reheating the fish was found to be moist and tender and was not subject to the dryness or fibrousness nor the off-flavour associated with conventional processing. The beneficial characteristics were preserved on storage.

EXAMPLE 8

A similar procedure to that described in Example 7 was followed except that the plaice fillets were injected with the marinate and vacuum tumbled for 10 minutes at −0.8 Bar.

After reheating, the fish was found to be moist and tender and was not subjected to the dryness or fibrousness nor the off-flavour associated with conventional processing. The beneficial effects were preserved on storage.

We claim:

1. A process for treating pieces of meat comprising:
    preparing an aqueous marinating or pickling medium containing a heat-stable starch in an amount of from 2% to 4% by weight based on the weight of the medium; and
    pickling or marinating pieces of meat by vacuum tumbling the meat pieces in the aqueous medium for a time sufficient to allow penetration of the starch into the meat, the medium being present in an amount of from 5% to 40% by weight based on the weight of the meat, and wherein the meat pieces are selected from the group consisting of diced pieces, slices, individual meat cuts and sides of carcasses.

2. A process according to claim 1 further comprising first injecting the medium into the meat and then vacuum tumbling the injected meat pieces in the medium.

3. A process according to claim 1 wherein the meat is vacuum tumbled a pressure of −0.8 bar.

4. A process according to claim 1, further comprising, before marinating or pickling, tempering the meat to a temperature of from −3° C. to +3° C. and then marinating or pickling the tempered meat at a temperature of from about 3° C. to 8° C.

5. A process according to claim 1 further comprising first frying the marinated or pickled meat and then cooking the fried meat.

6. A process according to claim 1 wherein the medium is present in an amount of from 10% to 35% by weight based upon the weight of the meat.

7. A process according to claim 1 wherein the medium is in an amount of from 15% to 30% by weight based upon the weight of the meat.

8. A process according to claim 1 wherein the medium contains the starch in an amount of from 0.75% to 1.5% by weight based upon the weight of the meat.

9. A process according to claim 1 wherein the heat-stable starch is also freeze-thaw stable.

10. A process for treating fish comprising:
    preparing an aqueous marinating or pickling medium containing a heat-stable starch in an amount of from 2% to 4% by weight based on the weight of the medium; and
    pickling or marinating fish by vacuum tumbling the fish in the aqueous medium for a time sufficient to allow penetration of the starch into the fish, the medium being present in an amount of from 2% to 30% by weight based on the weight of the fish.

11. A process according to claim 10 further comprising first injecting the medium into the fish and then vacuum tumbling the injected fish in the medium.

12. A process according to claim 10 wherein the fish is vacuum tumbled under a pressure of −0.8 bar.

13. A process according to claim 10 further comprising, before marinating or pickling, tempering the fish to a temperature of from −3° C. to +3° C. and then marinating or pickling the tempered fish at a temperature of from about 3° C. to 8° C.

14. A process according to claim 10 further comprising first frying the marinated or pickled fish and then cooking the fried fish.

15. A process according to claim 10 wherein the medium is present in an amount of from 5% to 15% by weight based upon the weight of the fish.

16. A process according to claim 10 wherein the heat-stable starch is also freeze-thaw stable.

* * * * *